United States Patent [19]

Ranney et al.

[11] 4,000,347
[45] Dec. 28, 1976

[54] PROCESS OF BONDING POLYSULFIDE SEALANT AND CAULK COMPOSITIONS

[75] Inventors: Maurice W. Ranney, Rockland; Robert J. Pickwell, Westchester, both of N.Y.

[73] Assignee: Union Carbide Corporation, New York, N.Y.

[22] Filed: Mar. 27, 1975

[21] Appl. No.: 562,780

[52] U.S. Cl. .............................. 428/419; 156/329; 260/448.2 N; 260/448.8 R; 427/407 R; 427/407 A; 427/409; 428/429; 428/447; 428/450

[51] Int. Cl.² ................ C07C 149/00; C03C 17/30

[58] Field of Search .......... 427/407, 409; 156/329, 156/314, 315; 428/447, 429, 391, 450, 419; 260/448.2 N, 448.8 R

[56] References Cited

UNITED STATES PATENTS

| | | | |
|---|---|---|---|
| 3,123,495 | 3/1964 | Carpenter et al. | 428/419 |
| 3,297,473 | 1/1967 | Bulbenko | 428/419 |
| 3,468,751 | 9/1969 | Tesoro | 428/419 |
| 3,476,826 | 11/1969 | Millen | 428/447 X |

*Primary Examiner*—Ralph Husack
*Attorney, Agent, or Firm*—George A. Skoler

[57] ABSTRACT

This invention relates to enhancing the bonding of polysulfide sealants to a variety of inorganic substrates, most particularly, to metal, ceramic, concrete, and glass substrates. The enhanced bonding of the polysulfide sealant is achieved by the use of a silane adhesion promoter which is characterized by the following formula: $(S_n)_a[R - SiX_3]_b$ wherein n is a number ranging from about 2 to about 6, a is a number equal to one-half the free valence of R, b is a number equal to at least 2, R is a divalent organic radical joined at one end to sulphur and at the other end to silicon, and X is a hydrolyzable group.

10 Claims, No Drawings

PROCESS OF BONDING POLYSULFIDE SEALANT AND CAULK COMPOSITIONS

THE PRIOR ART

Polysulfide polymers are old in the art. Their production is characterized by Fettes and Jorczak, Industrial and Engineering Chemistry, November 1950, on pages 2217–2223. Many patents have been issued covering them and their manufacturer, such as Patrick et al., U.S. Pat. No. 2,466,963, patented Apr. 12, 1949, and U.S. Pat. No. 2,485,107, patented Oct. 18, 1949, both assigned to Thiokol Corporation. Other patents relating to manufacture of polysulfide polymers are the following:

| Patent No. | Date of Issue |
| --- | --- |
| 2,049,974 | Aug. 4, 1936 |
| 2,100,351 | Nov. 30, 1937 |
| 2,142,144 | Jan. 3, 1939 |
| 2,142,145 | Jan. 3, 1939 |
| 2,195,380 | Mar. 26, 1940 |
| 2,206,641 | July 2, 1940 |
| 2,206,642 | July 2, 1940 |
| 2,206,643 | July 2, 1940 |
| 2,216,044 | Sept. 24, 1940 |
| 2,221,650 | Nov. 12, 1940 |
| 2,235,621 | Mar. 18, 1941 |
| 2,255,228 | Sept. 9, 1941 |
| 2,278,127 | Mar. 31, 1942 |
| 2,278,128 | Mar. 31, 1942 |

The commercial use of polysulfide polymers in the manufacture of sealants and caulking compostion has been long known and commercially used. This point is clearly indicated from the following U.S. patents: Bulbenko, U.S. Pat. No. 3,297,473, patented Jan. 10, 1967, Giordano, 3,312,669, patented Apr. 4, 1967, Plueddemann, 3,317,461, patented May 2, 1967; Carpenter et al, 3,123,495, patented Mar. 3, 1964.

Polysulfide polymers which are suitable for use in the manufacture of such sealants and caulks include the mercapto terminated polysulfide polymers sold by Thiokol, the Dion polymercaptans sold by Diamond Chemicals, a division of Diamond Shamrock Corporation, and the polymercaptans sold by Phillips Petroleum Company.

These polymers are made into caulks and sealants in a conventional manner using fillers and other additives, as well as curing agents. A wide range of oxidizing agents which oxidize terminal mercaptan groups of the polymer to extend them by forming them into extending disulfide bonds, can be used. These oxidizing agents are called curing agents. The most widely employed curing agents are lead dioxide, manganese dioxide, and calcium peroxide.

It has been known for a long time that polysulfide sealants do not effectively adhere to inorganic surfaces, such as, glass, ceramic, concrete or metal surfaces under high moisture conditions without the use of a silane adhesion promoter. Such silane adhesion promoters are characterized, in the typical case, as organo hydrolyzable silanes in which the organo groups possess a functional radical or group which is capable of inter-reacting with the mercapto groups associated with polysulfide polymers. Illustrative organo silanes which have been commercially employed as silane adhesion promoters in polysulfide sealant and caulking compositions are: vinyl-tris(2-methoxyethoxy)-silane (hereinafter called "A-172"), gamma-aminopropyltriethoxysilane (hereinafter called "A-1100"), gamma-mercaptopropyltrimethoxysilane (hereinafter called "A-189"), beta-mercaptoethyltriethoxysilane (hereinafter called "A-1893"), gamma-glycidyloxypropyltrimethoxysilane (hereinafter called "A-187"), and beta-(3,4-epoxycyclohexyl) ethyltrimethoxysilane (hereinafter called "A-186"). The aforementioned Bulbenko, Giordano, Plueddemann and Carpenter et al. patents discuss the utilization of organo silanes as adhesion promoters for polysulfide sealants. For example, of the organo silanes depicted in the Carpenter et al. patent none have been found in subsequent work to consistently behave as an effective adhesion promoter. That is to say, the adhesion promoters which are depicted in the Carpenter et al. patent have not been found to provide uniform results from batch to batch of polysulfide polymer sealant or caulking composition and as a result the most widely employed of the silane adhesion promoters in commercial activities are the two epoxy silanes and the two mercapto silanes recited above. Those particular silanes have proven to be highly effective as silane adhesion promoters in that they promote high levels of adhesion of the sealant to the substrate when used as a primer or integrally blended into the polysulfide sealant or caulking compositions.

There is always a commercial need for different silane adhesion promoters in enhancing the adhesion of polysulfide polymer sealants and caulks. There is described herein the utilization of silane adhesion promoters which heretofore have not been utilized in polysulfide sealant and caulking compositions and which provide repeatedly good adhesion under high moisture conditions when used as a primer or when integrally blended into the compositions.

THE INVENTION

This invention is concerned with polysulfide polymer compositions useful as sealants and caulks to inorganic substrates which contain a silane adhesion promoter which is a polysulfide substituted silane (or its hydrolyzate and condensates) having the following formula: $(S_n)_a[R - SiX_3]_b$ wherein $n$ is a number ranging from about to 2 to about 6, $a$ is a number equal to one-half the free valence of R, $b$ is a number equal to at least 2, R is a divalent organic radical joined at one end to sulphur and at the other end to silicon, and X is a hydrolyzable group.

This invention constituted an improvement in the manufacture and use of polysulfide sealant and caulk compositions. This invention involves the direct substitution of the aforementioned polysulfide substituted silanes for the organo silanes which have heretofore been used as adhesion promoters for such sealant and caulk compositions. In that respect, this invention utilizes the conventional technology of this art in the formulation of such sealants and caulks as well as their applications to inorganic substrates, such as concrete, brick, ceramic, glass and metal surfaces. To effect this invention one simply substitutes the aforementioned polysulfide substituted silane for the silane adhesion promoters previously utilized in the art. In that regard, there is incorportated by reference the disclosure at Column 1, lines 68–71 and Column 2, Lines 1–68, inclusive, of U.S. Pat. 3,312,669 mentioned above.

A typical sealant composition useful in the practice of this invention is characterized by the following formulations:

| Part A | Sealants | |
|---|---|---|
| | I | II |
| Thiokol LP-32 | 100 | 100 |
| Barytes | 110 | — |
| Titanium Dioxide | 10 | 10 |
| Aluminum Powder | 5 | — |
| Silica | 40 | — |
| Activated Calcium Carbonate | — | 25 |
| Stearic Acid | — | 1 |
| Epok Resin J498 | 10 | — |
| Dimethylol-p-cresol | — | 0.3 |
| A-172 | 4 | — |
| A-1100 | — | 2 |
| Part B | | |
| Lead Dioxide | 10 | 10 |
| Dibutyl Phthalate | 9 | 9 |
| Stearic Acid | 1 | 1 |

The above formulation is characteristic of a conventional two-package sealant composition, see Compositions I and II at col. 3 of U.S. Pat. No. 3,123,495, the disclosure of which is incorporated by reference. Another conventional two-part composition is characterized at column 3, starting at line 21 to line 75 of U.S. Pat. No. 3,212,669. Such formulations can be employed in the practice of this invention. At columns 3-5, inclusive, U.S. Pat. No. 3,123,495 discusses a number of sealant compositions and each one is incorporated herein by reference. However, with respect to each of those formulations of the aforementioned patents, the only difference with them and this invention is that in the practice of this invention there is substituted for those silane adhesion promoters recited in the formulations the polysulfide substituted silanes of this invention.

In a one package system, the sealant composition contains the curing agent so that when the sealant is used, it can be used directly from a single package which avoids the mixing of two ingredients, to wit, polysulfide polymers and fillers and stabilizers, etc., and a separate package comprising a curing agent.

The curing agent used in the one package system is a latent curing agent which has a relatively long shelf life when kept moisture free. However, when the catalyst (such as calcium peroxide) are activated by moisture, the cure of the sealant is initiated. This occurs when the sealant is removed from the package and applied to the substitute for sealing a joint or joints.

Illustrative of a typical one or single package white polysulfide sealant formulation is the following taken from U.S. Pat. No. 3,225,017:

| | |
|---|---|
| Thiokol LP-2 | 100 parts |
| Titanium Dioxide | 18 |
| Calcium Carbonate (Multiflex MM) | 45 |
| Dibutylphthalate | 15 |
| 80% ERL-2774 Epoxy in MEK | 5 |
| Calcium Peroxide (60%) | 10 |
| Barium Oxide | 10 |
| (Calcium Hydroxide) | 2.5 Thiokol Recommendation) |

Another typical polymercaptan single component sealant formulation taken from U.S. Pat. No. 3,618,760 is as follows:

| Ingredient | Parts |
|---|---|
| Polymercaptan base | 100 |
| A-189 | 1 to 1.5 |
| TiO$_2$ | 15 |
| Thixotropic Agent (Thixin R) | 4 |
| Calcium Carbonate (Supermultiflex) | 75 |
| Molecular Sieve 4A | 1 to 5 |
| Dioctylphthalate | 7 |
| Calcium Peroxide curing agent | 5 |

Typical of the properties of polysulfide polymers used in such sealant formulas are the following properties of Thiokol LP$^{TM}$ polymers.

PROPERTIES OF THIOKOL LP (REG. T.M.) POLYMERS

| PROPERTIES OF THIOKOL LP (REG. T.M.) POLYMERS | | | | |
|---|---|---|---|---|
| Polymer | LP-2 | LP-12 | LP-31 | LP-32 |
| Average Molecular Weight | 4,000 | 4,000 | 8,000 | 4,000 |
| Viscosity, Poises, 80° F | 400 | 400 | 800–1400 | 400 |
| Water, % | 0.1–0.2 | 0.2 max. | 0.1–0.2 | 0.1–0.2 |
| Thiol (SH) Content, max. | 2.2 | 1.8 | 1.1 | 2.0 |
| Percent Crosslinking Potential | 2.0 | 0.1 | 0.5 | 0.5 |

In the making of a sealant formula certain knowledge is commonly recognized. For example, sulphur also functions as an activator for lead dioxide curing. Up to 0.5 parts of sulfur is used in some recipes. The effect of sulfur is to decrease the set time of sealant compounds, increase the modulus and hardness, and to improve the compression set. However, too much sulfur can be used and amounts appreciably above 0.5 part per hundred cause excessive softening and sometimes sulfur in excess of 0.2 part per hundred markedly decreases adhesion of LP-2 based sealant compounds.

The cure rate is dependent to some extent on humidity and temperature. At room temperature, say 80° F. (26.7° C.) and 50% relative humidity, an LP-2 based compound catalyzed with lead peroxide will normally have a working life of 3 or 4 hours and become fully cured in 24 hours. Increases in temperature and humidity obviously accelerate the cure rate.

Manganese dioxide is also used to some extent for curing polysulfide sealant compounds. This catalyst is extremely sensitive to the presence of phenolic derived adhesion additives and other acidic ingredients. This limits its use in sealants. Generally, about 6 parts of manganese dioxide is recommended for each hundred parts of polysulfide base. The addition of 0.5 part of stearic acid is recommended to increase the working life by about 2 hours.

Calcium peroxide should be used as a curing agent when preparing light colored sealants. The fact that calcium peroxide is moisture activated makes it an excellent curing agent for the preparation of single package sealants, and it is apparently the only curing agent commonly used in those systems. Naturally, moisture must be avoided in compounding single package sealants containing calcium peroxide until ready to activate the peroxide and promote the crosslinking reaction. Approximately 10 parts of calcium peroxide are used for each hundred parts of polymer. This use of calcium peroxide as a curing agent is disclosed in U.S. Pat. No. 3,225,017.

Since the calcium peroxide requires moisture for initiation, moisture can be considered an essential element to obtaining satisfactory cures. After extrusion or application of the sealant, humidity and moisture transmission play a large part in regulating the rate of cure. At conditions of low humidity, days and weeks may be required to complete the cure, maybe as long as 30 days. At 100% relative humidity, cure is appreciably faster, a few days usually being sufficient, although there is some reason to suspect that some compounds respond differently since various additives can affect the rate of water vapor transmission through the sealant. Size and shape of the specimen also affect the rate of water vapor transmission and therefore the rate of cure.

Generally speaking, a finished polysulfide sealant contains the following ingredients:

A. 1. Liquid Polysulfide polymer, for example Thiokol LP-2, LP-31, or LP-32.
2. Fillers as silica, calcium carbonate, carbon black.
3. Sulfur
4. Retarders to control working life time.
B. 1. Plasticizers
2. Oxidizing or crosslinking agent
3. Pigment (if desired)

Further illustrative of recipes for two-part polysulfide sealants is the following:

|  |  | Black | Tan |
|---|---|---|---|
| Part A | LP-2 Polymer | 100 | 100 |
|  | Fillers |  |  |
|  | Multiflex MM | 5 |  |
|  | Icecap K |  | 25 |
|  | Titanox RA-50 |  | 30 |
|  | SRF No. 3 Carbon Black | 30 |  |
|  | Thixotropic Agents |  |  |
|  | Attagel L-20 | 3 |  |
|  | Cabosil MS-5 |  | 2 |
|  | Cure Control |  |  |
|  | Sulphur |  | 0.1 |
|  | Retarder |  |  |
|  | Stearic Acid | 1 |  |
|  | Plasticizer |  |  |
|  | Dibutylphthalate |  | 35 |
|  | Tackifiers |  |  |
|  | Methylon 75108 Phenolic |  | 5 |
|  | Durez 10694 | 5 |  |
| Part B |  |  |  |
|  | Curing Agent |  |  |
|  | $PbO_2$ | 7.5 | 7.5 |
|  | Plasticizer |  |  |
|  | Dibutylphthalate | 7.5 | 7.5 |

Instructions: Mix A and B to maintain 7.5 parts $PbO_2$ to 100 parts LP-2.

One particular commercial two-part system is the following:

| Ingredient | Parts |
|---|---|
| Part A |  |
| Thiokol LP-2 | 100 |
| Winnofil S (Stearate coated $CaCO_3$) | 45 |
| $TiO_2$ RLL | 15 |
| Silane A-187 | 3 |
| Thixseal A (Baker) | 4 |
| Santicizer 278 (Monsanto) | 25 |
| Stearic Acid | 1 |
| Part B |  |
| $MnO_2$ | 10 |
| Santicizer 278 (Monsanto) | 10 |

Single package formulations are similar, using however, carefully dried, almost anhydrous or calcined fillers, avoiding excess acidity, and also using approximately 10 parts of calcium peroxide directly in the formulation in place of lead dioxide as above. Calcium hydroxide is frequently added, about 2.3 parts per hundred polysulfide base, to insure a neutral pH and prolonged package life.

Suitable fillers for use in the manufacture of sealant compositions covered by this invention are set forth in Table I below.

TABLE I

MINERAL AND BLACK FILLERS FOR LP LIQUID POLYSULFIDE COMPOUNDS

| Filler | Composition | Spec. Gr. | Particle Size (Microns) | pH | %, Free Moisture | Supplier |
|---|---|---|---|---|---|---|
| Pelletex (SRF No.3) | Pelleted semi-reinforcing furnace | 1.80 | 0.08 | 8.5 | 1.0 | Cabot Corporation, Boston, Mass. |
| Sterling MT | Medium thermal | 1.80 | 0.46 | 9.5 | 0.5 | Cabot Corporation, Boston, Mass. |
| Calcene TM | pp'td calcium carbonate (coated) | 2.55 | 0.07 | 9.0–9.7 | 0.4 | Pittsburgh Plate Glass Co., Phila. |
| Multifex MM | pp'td calcium carbonate | 2.65 | 0.06 | 9.0 | 0.5 | Diamond Alkali Co., Cleveland, Ohio |
| Witcarb RC | pp'td calcium carbonate (coated) | 2.55 | 0.06 | 7.3–7.5 | 2.0 | Witco Chemical Co., New York, N. Y. |
| York White | Dry ground limestone | 2.71 | 5–10 | 9.4–9.7 | — | R.E. Carroll Inc., Trenton, N. J. |
| Calwhite | Wet ground calcium carbonate | 2.71 | 5 | 9.0–9.5 | — | The Georgia Marble Co., Tate, Ga. |
| OMYA BSH | Surface-treated chalk (1% stearic acid) | 2.70 | 1–3 | 7.0 | 0.1 | Pluess-Staufer (North American), Inc. New York, N. Y. |
| Icecap K | Anhydrous calcine clay | 2.63 | 1.0 | 5.0–6.0 | 0.5 | Burgess Pigment Co., Sandersville, Ga. |
| Cabosil | Fumed silica-99% $SiO_2$ | 2.2 | 0.015 | 3.5–4.2 | 1.0 | Cabot Corporation, Boston, Mass. |
| HiSil 233 | pp'td silica-87% $SiO_2$ | 2.0 | 0.02 | 6.5–7.3 | 6.0 | Pittsburgh Plate Glass Co., Phila. |

TABLE I-continued

MINERAL AND BLACK FILLERS FOR LP LIQUID POLYSULFIDE COMPOUNDS

| Filler | Composition | Spec. Gr. | Particle Size (Microns) | pH | %, Free Moisture | Supplier |
|---|---|---|---|---|---|---|
| Permolith 40M (Lithopone) | 29% Zinc sulfide 71% barium sulfate | 4.3 | 99.8% thru 325 mesh | 8.0–9.0 | — | The Sherwin Williams Co., Chicago, Ill. |
| Blanc Fixe | pp'td barium sulfate | 4.4 | 0.18 | 8.8–9.5 | 0.3 | The C.P. Hall Co., Akron, Ohio |
| Titanox RA-50 | Titanium dioxide | 4.1 | 0.3 | 7.0–8.0 | 0.7 | Titanium Pigment Corp., New York, N. Y. |
| Superlith XXXHD | Pure zinc sulfide | 4.1 | 99.97% thru 325 mesh | 7.1 | — | C.J. Osborn, Co., Linden, N. J. |
| Aluminum flake 422 | Aluminum powder | 2.5 | 100% thru 325 mesh | — | — | Van Horn, Metz and Co., Inc., Conshohocken |

The amounts of these fillers one uses in sealant and caulk formulae are characterized above in the sealant formulae and in the aforementioned patents which constitutes the prior art.

With respect to the polysulfide substituted silanes in which R is alkylene, their manufacture are described by F. Thurn and S. Wolff, in their presentation entitled "New Organo Functional Silanes for the Tire Industry" at the International Session of German Rubber Society in Munich on Sept. 2–5, 1974, and in German patents 2,141,159 and 2,141,160, both published on Mar. 1, 1973. When R is alkylene, $a$ is one. In a copending application Ser. No. 536,207, filed Dec. 24, 1974, there are described a variety of polysulfide substituted aryl silanes having the average formula

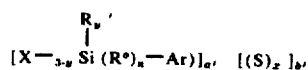

wherein X represents a hydrolyzable group such as halogen, alkoxy and acyloxy radicals; R' represents an alkyl radical containing from 1 to 4 carbon atoms; $y$ has a value of from 0 to 2 inclusive; R° represents a divalent bridging group such as alkylene and alkyleneoxy radicals containing from 1 to 7 carbon atoms; $n$ has a value of 0 to 1; Ar represents an aryl radical containing, e.g., from 6 to 12 carbon atoms; $(S)_x$ represents a divalent polysulfide radical each free valence of which is directly bonded to an aromatic carbon atom of an Ar radical whereby each Ar radical is bonded to another Ar radical through a $(S)_x$ radical; $x$ has a value of from 2 to 6; $a'$ has a value of at least 2; $b'$ has a value of at least 1; and the ratio of $a'$ to $b'$ is a value of not more than 2.

Specific illustratives of silanes which are covered by this invention are those which are characterized by the following formula:

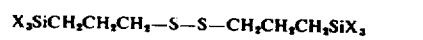

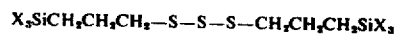

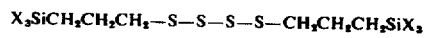

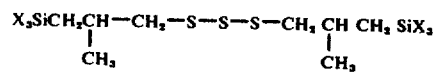

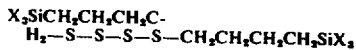

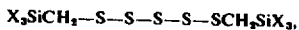

and mixture of the above;

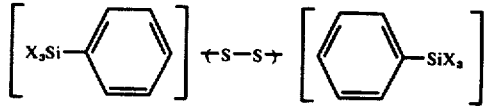

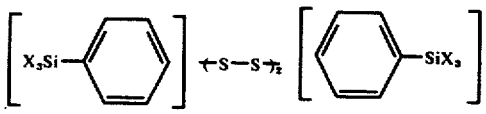

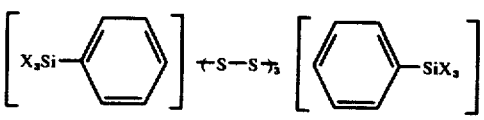

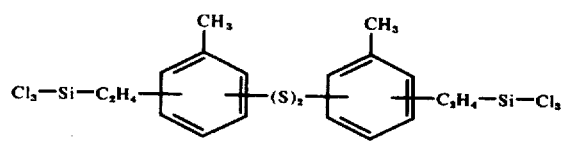

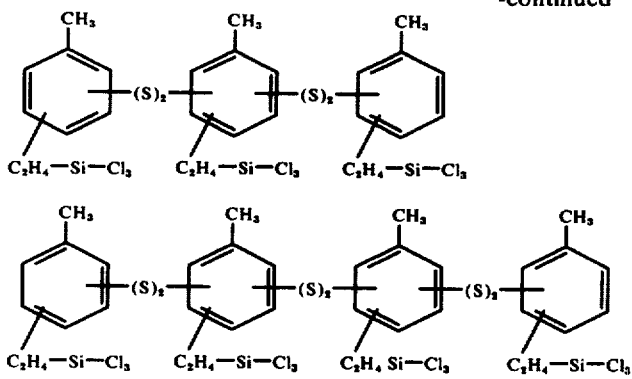

[Cl₃—Si—C₂H₄—Ar]₂ [(S)₂.₆₃]

wherein Ar is a tolylene radical

[(CH₃O)₃—Si—C₂H₄—Ar]₂ [(S)₂.₆₃]

wherein Ar is a tolylene radical

[C₂H₅O₃—Si—C₂H₄—Ar]₂ [(S)₂.₆₃]

wherein Ar is a tolylene radical

[Cl₃—Si—C₂H₄—Ar]₂ [(S)₂.₆₄]

wherein Ar is a tolylene radical

[(CH₃O)₃—Si—C₂H₄—Ar]₂ [(S)₂.₆₄]

wherein Ar is a tolylene radical

[Cl₃—Si—C₂H₄—Ar]₂ [(S)₃.₆₃]

wherein Ar is phenylene

[(CH₃O)₃—Si—C₂H₄—Ar]₂ [(S)₃.₆₃]

wherein Ar is a phenylene

[Cl₃—Si—C₂H₄—Ar]₂ [(S)₃.₂₅]

wherein Ar is a phenylene

[(CH₃O)₃—Si—C₂H₄—Ar]₂ [(S)₃.₂₅]

wherein Ar is a phenylene radical

[Cl₃—Si—C₂H₄—Ar]₂ [(S)₂.₉₀]

wherein Ar is a phenylene

[(CH₃O)₃—Si—C₂H₄—Ar]₂ [(S)₂.₉₀]

wherein Ar is a phenylene

[(CH₃O)₃—Si—C₂H₄—Ar]₂ [(S)₃.₇₁]

wherein Ar is a phenylene

[Cl₃—Si—C₂H₄—Ar]₂ [(S)₂.₃₆]

wherein Ar is a tolylene

[(C₂H₄O)₃—Si—C₂H₄—Ar]₂ [(S)₂.₃₆]

wherein Ar is a tolylene

The amount of the silane adhesion promoter which is incorporated into a sealant or caulking formulation, a technique called "integral blending", may range from as little as 0.01 weight % to about 6 weight %, based on the total weight of the composition, preferably from about 1 weight % to about 5 weight % based on the total weight of the sealant or caulking composition.

The amount of silane which is used in priming a substrate before coating the sealant or caulk to the substrate is that amount of silane which is capable of enhancing the adhesion of the caulk or sealant to the substrate. No amount is regarded to be critical. However, one should attempt to avoid putting down too thick a layer of silane to a substrate since this will cause the sealant or caulk to form a weaker adhesion boundary layer where it contacts the substrate or where the silane coating contacts the sealant or caulk. Usually, a solvent solution of the silane is applied to the substrate followed by evaporation of the solvent to leave behind a substrate which is primed with the silane.

It is important to appreciate that the amount of the silane which is used regardless of whether the technique for adhesion promotion is integral blending or priming should be sufficient to enhance the adhesion of the sealant or caulk to the substrate.

It should be recognized that the surfaces of the substrate should be properly cleaned prior to applying either the primer or the sealant or caulk containing the silane adhesion promoter.

Two commercially available polysulfide sealant compositions were used in the following experiments. They were single-package, cartridge type sealants, obtained directly from the manufacturers. Two different colors of sealant, black and gray, representing the two different manufacturers used. The adhesion-promoting silanes were examined in the selected polysulfide sealants by blending 2% by weight of the silane into portions of the sealant weighed out in suitable glass screw-cap jars. After thorough mixing with a clean spatula, portions of the sealant were applied to cleaned glass and aluminum test panels and the remaining material tightly sealed for future tests involving long term stability on storage. The entire weighing, mixing, and application sequence was performed in a standard glove box under an atmosphere of dry argon gas to prevent exposure of the material to moisture and consequent premature curing.

EXAMPLE 1

The following method was used for cleaning the test panels:

1. The aluminum panels were degreased with methylethylketone solvent and allowed to dry.
2. Each aluminum panel was thoroughly rubbed with 00 grade steel wool, to remove the oxide layer and were washed with a water solution of an Alconox laboratory detergent abrasive cleaner until it was completely wetted by a film of water which after draining, left a film of water on the surface.
3. The panels were rinsed in distilled water, blotted with paper towels and allowed to dry in a horizontal position at room temperature for several hours.

Similarly, glass test panels were cleaned as follows:
1. The glass was scrubbed with Ajax cleanser on a cloth pad until dipping in water and draining showed a flow-off of the water as a film rather than droplets.
2. The panels were rinsed in distilled water, blotted with clean paper toweling, and allowed to dry in a horizontal position at room temperature in a 50% relative humidity atmosphere for several hours.

These preparation procedures exceed the requirements of Federal Specification TT-S000227E for sealing compounds.

A small portion of the sealant containing the integrally blended silane was removed from the box and applied to the panels on the bench top. Remainder of the sealant remained in glass jars which were capped and removed from the box for shelf life tests. The test panels were allowed to stand overnight on the laboratory bench top at ambient conditions (≈20–25° C.), followed by three weeks exposure to 100% relative humidity at room temperature. The adhesion was examined after this initial three-week cure, then the test panels were immersed in tap water and tested after seven days immersion, again after thirty days immersion in the tap water at room temperature, and then after six months immersion. Also, after 6 months storage, the unused, stored portions of the sealants containing integrally blended silanes were identically retested.

The adhesion of the cured sealant beads to the test panels was measured by partially stripping the cured sealant from the substrate and noting whether failure was adhesive at the substrate surface, indicating poor adhesion, or cohesive within the sealant, indicating the bond to the substrate was desirably stronger than the cohesive forces within the cured sealant.

Experimental

One gram of the silanes listed below were thoroughly blended into 50 grams of each of the selected black and gray colored commercial polysulfide based sealants under conditions of less than 150 parts per million of moisture in a suitable glove box. Portions of each of the mixed sealants were applied to both glass and aluminum test panels as stated above and tested. In every test, only cohesive failure was found. At no time did a test result, in these cases, in adhesive failure. There was no evidence of cure interference on a 6 month storage test when the samples were retested. The same two commercially available sealants without the addition of the silanes and similarly applied to glass and aluminum test panels showed complete adhesive failure as the sealant was easily stripped from the substrates.

SILANES TESTED 1. bis (gamma-trimethoxysilylpropyl) disulfide

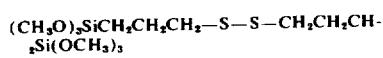

2. bis (gamma-trimethoxysilylpropyl) tetrasulfide

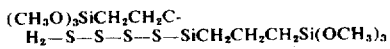

3. bis (4-trimethoxysilyltolyl) trisulfide

EXAMPLE 2

The method employed for the testing and evaluation of all silane compounds in this example is described below:

The silane primer materials were 5 weight % solution of the silane adhesion promoters A and C, cited below, in a 90/10 mixture by weight of SD-3A (denatured) ethanol/water and a 5 weight % solution of silane adhesion promoters B and D, cited below, in toluene. They were applied to suitably cleaned and dried (as described in Example 1) glass and aluminum panels as test substrates, allowing several hours to dry at room temperature.

The silane primer solutions were applied on the panels by brushing with a clean camels hair brush which had been dipped into the primer solution and lightly drained by touching the rim of the storage bottle container. The primed panels were then placed flat on a benchtop and allowed to dry for 3 or 4 hours at room temperature.

Four commercially available polysulfide sealant compositions were used in these evaluations. They were single-package, cartridge type sealants, obtained directly from the manufacturer. Four different colors of sealant, limestone, tan, gray, and bronze sealants representing two different manufacturers were used. The sealant was applied to the test panels as beads of sealant extruded from the standard hand-held type caulking gun to provide uniform, smooth, ⅜ inch diameter beads of material running the full length of the 6 inch long panels.

The sealant was allowed to dry overnight at room temperature at 50% relative humidity, followed by 3 weeks exposure to 100% relative humidity at room temperature (≈20°–25° C.). The adhesion was examined after this initial 3-week cure, then the test panels were immersed in tap water and tested after 7 days immersion, and again after 30 days immersion in the tap water at room temperature.

The adhesion of the cured sealant beads to the test panels was measured by partially stripping the cured sealant from the substrate and noting whether failure was adhesive at the substrate surface, indicating poor adhesion, or cohesive within the sealant, indicating the bond to the substrate was desirably stronger than the cohesive forces within the cured sealant.

Experimental

Panels of the cleaned glass and aluminum were primed with the 5% solutions of the silanes and allowed to dry for several hours. Beads of the limestone, tan, bronze, and gray commercial polysulfide-based sealant were applied to the primed panels. After curing 3 weeks room temperature, 100% relative humidity, there was no adhesive failure, only cohesive failure illustrating good adhesion with each panel. Similarly, after 1 week and 4-week water immersion periods, the sample peel tests showed only cohesive failure indicating good adhesion of the sealant to the primed test panels. The same four commercially available sealants similarly applied to cleaned unprimed glass and aluminum substrates (test panels) showed complete adhesive failure in that the sealant beads were easily stripped from the unprimed glass and aluminum surfaces.

SILANES TESTED

A. bis-(gamma-trimethoxysilylpropyl) disulfide
B. bis-(gamma-trimethoxysilylpropyl) trisulfide
C. bis-(gamma-trimethoxysilylpropyl) tetrasulfide
D. bis-(4-trimethoxysilyltolyl) trisulfide

What is claimed is:

1. The process of enhancing the bonding of polysulfide sealants and caulk compositions to solid inorganic surfaces which comprises providing at the interface of the caulk or sealant composition and said surface a silane, or the hydrolyzate or condensate of silane, having the formula:

$(S_n)_a[R - SiX_3]_b$ wherein n is a number ranging from about 2 to about 6, $a$ is a number equal to one-half the free valence of R, $b$ is a number equal to at least 2, R is a divalent organic radical joined at one end to sulphur and at the other end to silicon, and X is a hydrolyzable group comprised of halogen, alkoxy or acyloxy radicals.

2. The process of claim 1 wherein R in the silane is alkylene.

3. The process of claim 1 wherein the silane has the formula:

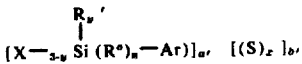

wherein X represents a hydrolyzable group such as halogen, alkoxy and acyloxy radicals; $R'$ represents an alkyl radical containing from 1 to 4 carbon atoms; $y$ has a value of from 0 to 2 inclusive; $R^o$ represents a divalent briding group such as alkylene and alkyleneoxy radicals containing from 1 to 7 carbon atoms; $n$ has a value of 0 to 1; Ar represents an aryl radical containing, e.g., from 6 to 12 carbon atoms; $(S)_x$ represents a divalent polysulfide radical each free valence of which is directly bonded to an aromatic carbon atom of an Ar radical whereby each Ar radical is bonded to another Ar radical through a $(S)_x$ radical; $x$ has a value of from 2 to 6; $a'$ has a value of at least 2; $b'$ has a value of at least 1; and the ratio of $a'$ to $b'$ is a value of not more than 2.

4. The process of claim 2 wherein the silane is bis-(gamma-trimethoxysilylpropyl) disulfide.

5. The process of claim 2 wherein the silane is bis-(gamma-trimethoxysilylpropyl) trisulfide.

6. The process of claim 2 wherein the silane is bis-(gamma-trimethoxysilylpropyl) tetrasulfide.

7. The process of claim 3 wherein the silane is bis-(4-trimethoxysilyltolyl) trisulfide.

8. The product of the process of claim 1.
9. The product of the process of claim 2.
10. The product of the process of claim 3.

* * * * *

UNITED STATES PATENT OFFICE
CERTIFICATE OF CORRECTION

Patent No. 4,000,347      Dated December 28, 1976

Inventor(s) Maurice W. Ranney and Robert J. Pickwell

It is certified that error appears in the above-identified patent and that said Letters Patent are hereby corrected as shown below:

Col. 1, line 43, after "Dion" insert -- TM --

Col. 4, lines 26 and 27, "PROPERTIES OF THIOKOL LP (REG.T.M.) POLYMERS" (first appearance) should be deleted Col. 11, line 5, after "Alconox" insert -- TM --

Col. 11, line 13, after "Ajax" insert -- TM --

Signed and Sealed this

Twenty-seventh Day of June 1978

[SEAL]

Attest:

RUTH C. MASON
*Attesting Officer*

DONALD W. BANNER
*Commissioner of Patents and Trademarks*